US008222183B2

(12) United States Patent
Ono

(10) Patent No.: US 8,222,183 B2
(45) Date of Patent: Jul. 17, 2012

(54) THERMOCHROMIC COLORING COLOR-MEMORY COMPOSITION AND THERMOCHROMIC COLORING COLOR-MEMORY MICROCAPSULE PIGMENT CONTAINING THE SAME

(75) Inventor: Yoshiaki Ono, Nagoya (JP)

(73) Assignee: The Pilot Ink Co., Ltd., Aichi (JP)

( * ) Notice: Subject to any disclaimer, the term of this patent is extended or adjusted under 35 U.S.C. 154(b) by 467 days.

(21) Appl. No.: 12/595,388

(22) PCT Filed: Apr. 10, 2008

(86) PCT No.: PCT/JP2008/057113
§ 371 (c)(1),
(2), (4) Date: Oct. 9, 2009

(87) PCT Pub. No.: WO2008/133028
PCT Pub. Date: Nov. 6, 2008

(65) Prior Publication Data
US 2010/0120614 A1    May 13, 2010

(30) Foreign Application Priority Data

Apr. 12, 2007   (JP) ................................. 2007-104391
Mar. 17, 2008   (JP) ................................. 2008-067464

(51) Int. Cl.
*B41M 5/337* (2006.01)
*B43K 5/00* (2006.01)
*C09D 11/00* (2006.01)
*C09K 9/02* (2006.01)

(52) U.S. Cl. ..................... 503/201; 106/31.23; 252/583; 252/586

(58) Field of Classification Search ........................ None
See application file for complete search history.

(56) References Cited

U.S. PATENT DOCUMENTS 7,708,913 B2 *  5/2010  Fujita ............................ 252/586
7,794,631 B2 *  9/2010  Fujita ............................ 252/586

FOREIGN PATENT DOCUMENTS

| EP | 1477320 A2 | 11/2004 |
|---|---|---|
| JP | 49-032885 A | 3/1974 |
| JP | 49-078682 A | 7/1974 |
| JP | 2004-107367 A | 4/2004 |
| JP | 2005-001369 A | 1/2005 |
| JP | 2005-342973 A | 12/2005 |
| JP | 2006022213 A | 1/2006 |
| JP | 2006-057031 A | 3/2006 |
| JP | 2006-137886 A | 6/2006 |
| JP | 2006-233110 A | 9/2006 |

OTHER PUBLICATIONS

Extended European Search Report, Application No. 08740212.9, dated Aug. 2, 2010.
International Search Report dated Jun. 17, 2008 (PCT/JP2008/057113).

* cited by examiner

*Primary Examiner* — Bruce H Hess
(74) *Attorney, Agent, or Firm* — Sughrue Mion, PLLC

(57) ABSTRACT

The present invention provides a thermochromic coloring color-memory composition which effectively produce a characteristic that colors can be reversibly memorized and maintained and has applicability to various fields and a thermochromic coloring color-memory microcapsule pigment containing the composition.

A thermochromic coloring color-memory composition comprising a homogeneous solubilized mixture of (A) an electron donative coloring organic compound, (B) an electron accepting compound and (C) a compound represented by the following formula (1) as a reaction medium which controls color reactions of the components (A) and (B):

[Chem 1]
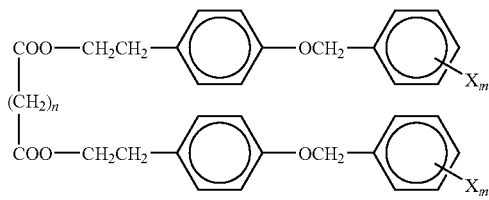
(1)
wherein X represents any of a hydrogen atom, an alkyl group having 1 to 4 carbon atoms, a methoxy group, and a halogen atom, m represents an integer of from 1 to 3, and n represents an integer of from 1 to 20.
7 Claims, 1 Drawing Sheet

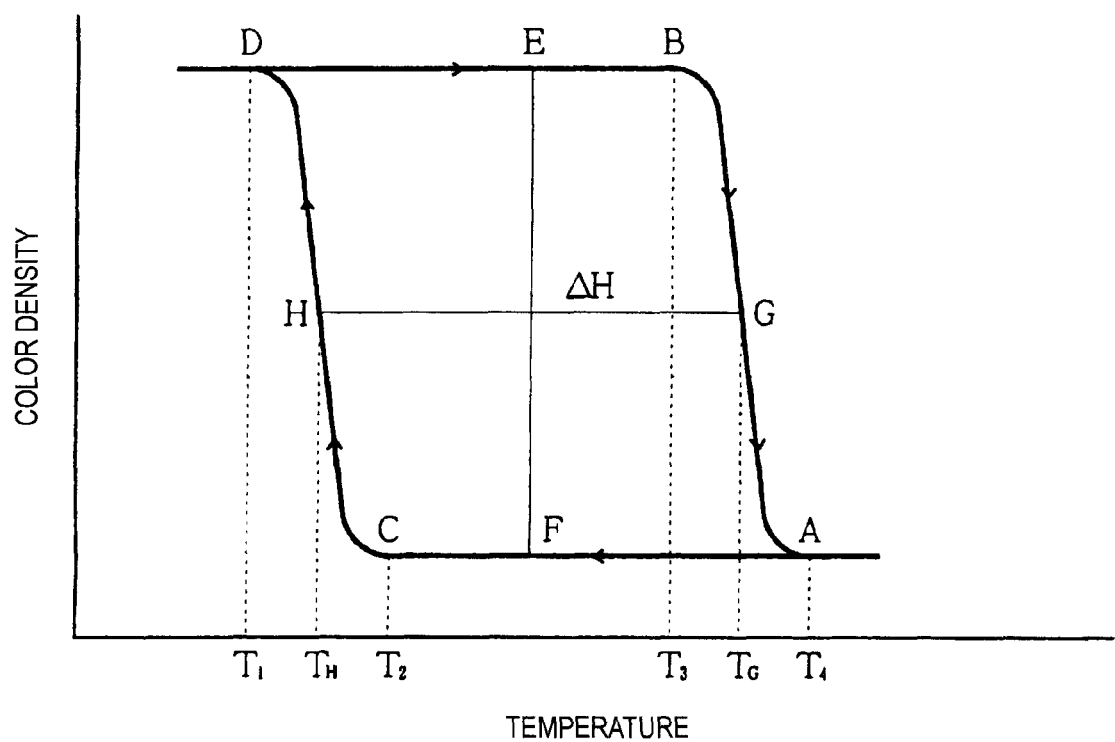

THERMOCHROMIC COLORING COLOR-MEMORY COMPOSITION AND THERMOCHROMIC COLORING COLOR-MEMORY MICROCAPSULE PIGMENT CONTAINING THE SAME

TECHNICAL FIELD

The present invention relates to a thermochromic coloring color-memory composition and a thermochromic coloring color-memory microcapsule pigment containing the same. More specifically, it relates to a thermochromic coloring color-memory composition which displays reversible discoloration between coloring and decoloring by showing a large hysteresis characteristic based on a change in temperature and keeps either of the colored state and decolored state alternately and reversibly even after removal of application of the heat or cold required for the discoloration, and to a thermochromic coloring color-memory microcapsule pigment containing the same.

BACKGROUND ART

The applicant has already proposed such a type of thermochromic coloring color-memory material (see e.g., Patent Document 1).

Conventional reversible thermal discoloration materials discolor with a discoloration temperature as a border. In the material, only one specified state of both states before and after discoloration exists within a normal temperature range, and the other state is maintained while a heat or cold necessary for expressing the state is applied but returns to the state of normal temperature range when application of the heat or cold is removed. In comparison with such a type, the above-described thermochromic coloring color-memory material can selectively maintain, within a normal temperature range, either of the color on the side lower than the discoloration temperature and the color on the side higher than that and can alternately maintain the color by applying a heat or cold as needed. The material is therefore used in various fields such as temperature-sensitive recording materials, toys, ornaments and printing.

Patent Document 1: JP-A-2004-107367

DISCLOSURE OF THE INVENTION

Problems that the Invention is to Solve

As is disclosed in the above-described JP-A-2004-107367, such a kind of color-memorizing effect is produced only in a system where, among compounds selected from esters that control the color reaction, a specified compound is used as a constituting component.

The invention contemplates further searching for compounds serving as a reaction medium useful for producing the above-described color-memorizing effect, enhancing freedom of selection of the reaction medium, and further promoting the use of such a kind of thermochromic coloring color-memory material.

Means for Solving the Problems

The present inventors have found that a system using, as a reaction medium for color reaction, a compound having a specific structure shows a thermal discoloration characteristic with a large maximum hysteresis width ($\Delta H$) and produces an effective color-memorizing effect. Thus, they have completed the present invention.

A requirement of the invention is a thermochromic coloring color-memory composition which comprises a homogeneous solubilized mixture of (A) an electron donative coloring organic compound, (B) an electron accepting compound and (C) a compound represented by the following formula (1) as a reaction medium which controls color reactions of the components (A) and (B):

[Chem 1]

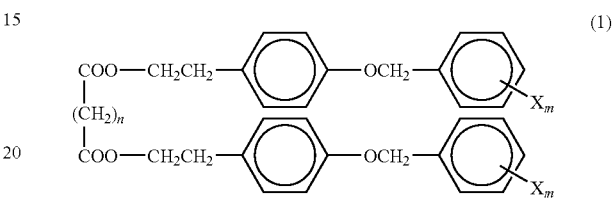

(1)

wherein X represents any of a hydrogen atom, an alkyl group having 1 to 4 carbon atoms, a methoxy group, and a halogen atom, m represents an integer of from 1 to 3, and n represents an integer of from 1 to 20.

Further requirements are a thermochromic coloring color-memory microcapsule pigment containing the above-described thermochromic coloring color-memory composition; the above-described thermochromic coloring color-memory microcapsule pigment wherein the pigment discolors while showing a maximum hysteresis width of from 8° C. to 110° C. regarding a color density-temperature curve; the above-described thermochromic coloring color-memory microcapsule pigment wherein the pigment has a complete decoloring temperature ($T_4$) of 40° C. or higher and a coloring starting temperature ($T_2$) of 20° C. or lower and wherein the pigment has color-memory ability at the ordinary temperature range.

Additional requirements are a thermochromic coloring color-memory liquid composition comprising the above-described thermochromic coloring color-memory microcapsule pigment and a vehicle; a thermochromic coloring color-memory resin composition for molding comprising the above-described thermochromic coloring color-memory microcapsule pigment and a resin for molding; and a thermochromic coloring color-memory laminate comprising a support and a reversible thermochromic layer wherein the above-described thermochromic coloring color-memory microcapsule pigment is fixed to a resin in a dispersed state, the layer being provided on the support.

Advantage of the Invention

The invention makes it possible to cause reversible discoloration of coloring and decoloring showing a broad maximum hysteresis width ($\Delta H$) regarding a color density-temperature curve, alternately memorize and keep both of the color on the low temperature side and the color on the high temperature side with the discoloration temperature as a border, and effectively produce a characteristic that either of the colors can be reversibly reproduced, memorized and maintained by applying a heat or cold as needed, so that a thermochromic coloring color-memory composition having applicability to various fields such as thermo-color materials, ornaments, toys and training elements and a thermochromic coloring color-memory microcapsule pigment containing the composition can be provided.

BRIEF DESCRIPTION OF THE DRAWINGS

[FIGURE] The FIGURE is a graph for explaining a hysteresis characteristic of the thermochromic coloring color-memory composition of the present invention in a color density-temperature curve.

DESCRIPTION OF REFERENCE NUMERALS AND SIGNS

| | |
|---|---|
| $T_1$ | complete coloring temperature |
| $T_2$ | coloring starting temperature |
| $T_3$ | decoloring starting temperature |
| $T_4$ | complete decoloring temperature |
| ΔH | maximum hysteresis width |

BEST MODE FOR CARRYING OUT THE INVENTION

A hysteresis characteristic in a color density-temperature curve of the thermochromic coloring color-memory composition and thermochromic coloring color-memory microcapsule pigment using the same according to the invention will next be described based on the graph of FIG. 1.

In the FIGURE, the color density is plotted on the ordinate and the temperature on the abscissa. A change in the color density due to a temperature change progresses along the arrow. On this graph, A is a point showing the density at a temperature $T_4$ at which a decolored state reaches a completely decolored state (hereinafter referred to as "complete decoloring temperature"), B is a point showing the density at a temperature $T_3$ at which a completely colored state can be maintained (hereinafter referred to as "decoloring starting temperature"), C is a point showing the density at a temperature $T_2$ at which a completely decolored state can be maintained (hereinafter referred to as "coloring starting temperature"), and D is a point showing the density at a temperature $T_1$ at which a colored state reaches a completely colored state (hereinafter referred to as "complete coloring temperature").

The discoloration temperature region is a temperature region between the $T_1$ and $T_4$ wherein two phases of the colored state and decolored state can coexist, while the temperature region between $T_2$ and $T_3$ which has a large difference in the color density is a substantial discoloration temperature region (two phase retention region).

The length of the line segment EF is a measure showing contrast of discoloration, and the length of the line segment HG is a temperature width showing the degree of hysteresis (hereinafter referred to as "maximum hysteresis width ΔH"). The larger ΔH value facilitates keeping of each state before and after discoloration.

The ΔH value permitting retention of each state before and after discoloration falls within a temperature range of from 8° C. to 110° C. Here, Δt which is a difference between $T_4$ and $T_3$ or a difference between $T_2$ and $T_1$ is a measure for showing sensibility of the discoloration and a range of from 1° C. to 15° C., preferably a range of from 1° C. to 10° C. is suited for practical use.

In addition, in order to allow only one specified state of both states before and after discoloration to exist in a normal temperature range, the complete decoloring temperature ($T_4$) is 40° C. or higher, preferably 45° C. or higher, more preferably 50° C. or higher, and the coloring starting temperature ($T_2$) is 20° C. or lower, preferably 10° C. or lower, more preferably 0° C. or lower.

Although the ratio of the three constituting components (A), (B) and (C) in the invention depends on the concentration, discoloration temperature, discoloration mode and kind of each component, the component ratio of the components (A), (B) and (C) at which desired characteristics are obtained is component (B) within the range of from 0.1 to 50, preferably from 0.5 to 20, and component (C) within the range of from 1 to 800, preferably from 5 to 200, based on component (A) 1 (each of the above-described ratios is part(s) by mass).

Each component may be a mixture of two or more species, and additives such as an antioxidant, an ultraviolet absorbent, an infrared absorbent and a solubilizing aid can be added thereto within a range not damaging its function.

Compounds of the components (A), (B) and (C) will next be exemplified specifically.

As the component (A) of the invention, namely an electron donative coloring organic compound, conventionally known compounds such as diphenylmethane phthalides, phenylindolyl phthalides, indolyl phthalides, diphenylmethane azaphthalides, phenylindolyl azaphthalides, fluorans, styrylquinolines and diazarhodamine lactones may be mentioned, and examples of these compounds are shown below.

Examples include 3,3-bis(p-dimethylaminophenyl)-6-dimethylaminophthalide, 3-(4-diethylaminophenyl)-3-(1-ethyl-2-methylindol-3-yl)phthalide, 3,3-bis(1-n-butyl-2-methylindol-3-yl)phthalide, 3,3-bis(2-ethoxy-4-diethylaminophenyl)-4-azaphthalide, 3-(2-ethoxy-4-diethylaminophenyl)-3-(1-ethyl-2-methylindol-3-yl)-4-azaphthalide, 3-[2-ethoxy-4-(N-ethylanilino)phenyl]-3-(1-ethyl-2-methylindol-3-yl)-4-azaphthalide, 3,6-diphenylaminofluoran, 3,6-dimethoxyfluoran, 3,6-di-n-butoxyfluoran, 2-methyl-6-(N-ethyl-N-p-tolylamino)fluoran, 2-N,N-dibenzylamino-6-diethylaminofluoran, 3-chloro-6-cyclohexylaminofluoran, 2-methyl-6-cyclohexylaminofluoran, 2-(2-chloroanilino)-6-di-n-butylaminofluoran, 2-(3-trifluoromethylanilino)-6-diethylaminofluoran, 2-(N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1,2-benz-6-diethylaminofluoran, 1,2-benz-6-(N-ethyl-N-isobutylamino)fluoran, 1,2-benz-6-(N-ethyl-N-isoamylamino)fluoran, 2-(3-methoxy-4-dodecoxystyryl)quinoline, spiro[5H-(1)benzopyrano(2,3-d)pyrimidine-5,1'(3'H)isobenzofuran]-3'-one, 2-(diethylamino)-8-(diethylamino)-4-methyl-, spiro[5H-(1)benzopyrano(2,3-d)pyrimidine-5,1'(3'H)isobenzofuran]-3'-one, 2-(di-n-butylamino)-8-(di-n-butylamino)-4-methyl-, spiro[5H-(1)benzopyrano(2,3-d)pyrimidine-5,1'(3'H)isobenzofuran]-3'-one, 2-(di-n-butylamino)-8-(diethylamino)-4-methyl-, spiro[5H-(1)benzopyrano(2,3-d)pyrimidine-5,1'(3'H)isobenzofuran]-3'-one, 2-(di-n-butylamino)-8-(N-ethyl-N-i-amylamino)-4-methyl-, spiro[5H-(1)benzopyrano(2,3-d)pyrimidine-5,1'(3'H)isobenzofuran]-3'-one, 2-(di-n-butylamino)-8-(di-n-butylamino)-4-phenyl, 3-(2-methoxy-4-dimethylaminophenyl)-3-(1-butyl-2-methylindol-3-yl)-4,5,6,7-tetrachlorophthalide, 3-(2-ethoxy-4-diethylaminophenyl)-3-(1-ethyl-2-methylindol-3-yl)-4,5,6,7-tetrachlorophthalide, and 3-(2-ethoxy-4-diethylaminophenyl)-3-(1-pentyl-2-methylindol-3-yl)-4,5,6,7-tetrachlorophthalide.

Additional examples include pyridine, quinazoline and bisquinazoline compounds which are effective for producing fluorescent yellow to red colors.

Examples of the electron accepting compound as the component (B) include a group of compounds having an active proton, a group of pseudo-acidic compounds (a group of compounds which are not acid but cause color development of the component (A) by acting as acid in the composition) and a group of compounds having electron voids.

Examples of the compounds having an active proton include monophenols and polyphenols as compounds having a phenolic hydroxyl group, those having an alkyl group, an aryl group, an acyl group, an alkoxycarbonyl group, a carboxy group and an ester thereof, an amide group or a halogen group as a substituent, and bisphenols, trisphenols and phenol-aldehyde condensed resins. They may also be metal salts of the above-described compounds having a phenolic hydroxyl group.

The specific examples include:

phenol, o-cresol, tertiary butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 2,2-bis(4-hydroxyphenyl)propane, 4,4-dihydroxydiphenylsulfone, 1,1-bis(4-hydroxyphenyl) ethane, 2,2-bis(4-hydroxy-3-methylphenyl)propane, bis(4-hydroxyphenyl)sulfide, 1-phenyl-1,1-bis(4-hydroxyphenyl) ethane, 1,1-bis(4-hydroxyphenyl)-3-methylbutane, 1,1-bis (4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 2,2-bis(4-hydroxyphenyl)butane, 2,2-bis(4-hydroxyphenyl)ethyl propionate, 2,2-bis(4-hydroxyphenyl)-4-methylpentane, 2,2-bis(4-hydroxyphenyl)hexafluoropropane, 2,2-bis(4-hydroxyphenyl)-n-heptane and 2,2-bis(4-hydroxyphenyl)-n-nonane.

Although the above-described compound having a phenolic hydroxyl group can produce most effective thermal discoloration characteristics, a compound selected from aromatic carboxylic acids, aliphatic carboxylic acids having from 2 to 5 carbon atoms, carboxylic acid metal salts, acidic phosphoric acid esters and metal salts thereof, and 1,2,3-triazole and derivatives thereof may be used instead.

The ester compound as the component (C) will next be described specifically.

The ester compounds for use in the invention are compounds represented by the formula (1), wherein X represents any of a hydrogen atom, an alkyl group having from 1 to 4 carbon atoms, a methoxy group, and a halogen atom, preferably a hydrogen atom, a halogen atom, or an alkyl group having from 1 to 4 carbon atoms, and more preferably a hydrogen atom, a halogen atom, or an alkyl group having from 1 to 2 carbon atoms.

m represents an integer of from 1 to 3, preferably from 1 or 2.

n represents an integer of from 1 to 20, preferably from 3 to 10.

The ester compound represented by the formula (1) is an ester compound which is formed of a dicarboxylic acid and 2-(4-benzyloxyphenyl)ethanol or a 2-(4-benzyloxyphenyl) ethanol derivative and specifically, the compound is obtained by esterification of a dicarboxylic acid represented by the following formula (2) and 2-(4-benzyloxyphenyl)ethanol or substituted 2-(4-benzyloxyphenyl)ethanol represented by the following formula (3).

[Chem 2]

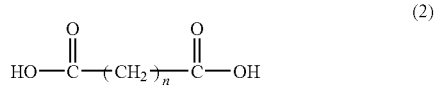

The dicarboxylic acid of the formula (2) includes compounds shown in the following Table 1. In the table, n is an integer of from 1 to 20, which corresponds to that in the formula (2).

TABLE 1

| n  | Name of compound              |
|----|-------------------------------|
| 1  | malonic acid                  |
| 2  | succinic acid                 |
| 3  | glutaric acid                 |
| 4  | adipic acid                   |
| 5  | pimelic acid                  |
| 6  | suberic acid                  |
| 7  | azelaic acid                  |
| 8  | sebacic acid                  |
| 9  | 1,9-nonanedicarboxylic acid   |
| 10 | 1,10-decanedicarboxylic acid  |
| 11 | 1,11-undecanedicarboxylic acid|
| 12 | 1,12-dodecanedicarboxylic acid|
| 13 | 1,13-tridecanedicarboxylic acid|
| 14 | 1,14-tetradecanedicarboxylic acid|
| 15 | 1,15-pentadecanedicarboxylic acid|
| 16 | 1,16-hexadecanedicarboxylic acid|
| 17 | 1,17-heptadecanedicarboxylic acid|
| 18 | 1,18-octadecanedicarboxylic acid|
| 19 | 1,19-nonadecanedicarboxylic acid|
| 20 | 1,20-eicosanedicarboxylic acid|

[Chem 3]

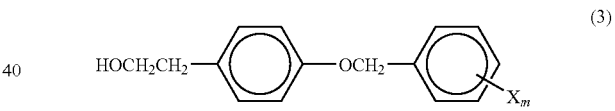

Compounds shown in the following Table 2 may be mentioned as 2-(4-benzyloxyphenyl)ethanol or substituted 2-(4-benzyloxyphenyl)ethanol represented by the following formula (3). In the table, X is a hydrogen atom, an alkyl group having 1 to 4 carbon atoms, a methoxy group or a halogen atom which corresponds to those in the formula (3) and m is an integer of from 1 to 3.

TABLE 2

| X              | m | Name of compound                              |
|----------------|---|-----------------------------------------------|
| Hydrogen atom  | 1 | 2-(4-benzyloxyphenyl)ethanol                  |
| Alkyl group    | 1 | 2-[4-(4-methylbenzyloxy)phenyl)]ethanol       |
|                |   | 2-[4-(3-methylbenzyloxy)phenyl)]ethanol       |
|                |   | 2-[4-(2-methylbenzyloxy)phenyl)]ethanol       |
|                |   | 2-[4-(4-ethylbenzyloxy)phenyl)]ethanol        |
|                |   | 2-[4-(4-isopropylbenzyloxy)phenyl)]ethanol    |
|                |   | 2-[4-(4-n-butylbenzyloxy)phenyl)]ethanol      |
|                |   | 2-[4-(4-tert-butylbenzyloxy)phenyl)]ethanol   |
|                | 2 | 2-[4-(2,4-dimethylbenzyloxy)phenyl)]ethanol   |
|                |   | 2-[4-(2,5-dimethylbenzyloxy)phenyl)]ethanol   |
|                |   | 2-[4-(2,6-dimethylbenzyloxy)phenyl)]ethanol   |
|                |   | 2-[4-(3,4-dimethylbenzyloxy)phenyl)]ethanol   |
|                |   | 2-[4-(3,5-di-tert-butylbenzyloxy)phenyl)]ethanol |
|                | 3 | 2-[4-(2,4,6-trimethylbenzyloxy)phenyl)]ethanol |

TABLE 2-continued

| X | m | Name of compound |
|---|---|---|
| | | 2-[4-(2,4,6-triisopropylbenzyloxy)phenyl)]ethanol |
| Halogen atom | 1 | 2-[4-(4-chlorobenzyloxy)phenyl)]ethanol |
| | | 2-[4-(3-chlorobenzyloxy)phenyl)]ethanol |
| | | 2-[4-(2-chlorobenzyloxy)phenyl)]ethanol |
| | | 2-[4-(4-bromobenzyloxy)phenyl)]ethanol |
| | | 2-[4-(3-bromobenzyloxy)phenyl)]ethanol |
| | | 2-[4-(2-bromobenzyloxy)phenyl)]ethanol |
| | | 2-[4-(4-iodobenzyloxy)phenyl)]ethanol |
| | | 2-[4-(3-iodobenzyloxy)phenyl)]ethanol |
| | | 2-[4-(2-iodobenzyloxy)phenyl)]ethanol |
| | | 2-[4-(4-fluorobenzyloxy)phenyl)]ethanol |
| | | 2-[4-(3-fluorobenzyloxy)phenyl)]ethanol |
| | | 2-[4-(2-fluorobenzyloxy)phenyl)]ethanol |
| | 2 | 2-[4-(2,3-dichlorobenzyloxy)phenyl)]ethanol |
| | | 2-[4-(2,4-dichlorobenzyloxy)phenyl)]ethanol |
| | | 2-[4-(2,6-dichlorobenzyloxy)phenyl)]ethanol |
| | | 2-[4-(3,4-dichlorobenzyloxy)phenyl)]ethanol |
| | | 2-[4-(2,4-difluorobenzyloxy)phenyl)]ethanol |
| | | 2-[4-(2,5-difluorobenzyloxy)phenyl)]ethanol |
| | | 2-[4-(3,4-difluorobenzyloxy)phenyl)]ethanol |
| | | 2-[4-(3,5-difluorobenzyloxy)phenyl)]ethanol |
| | | 2-[4-(2-chloro-4-fluorobenzyloxy)phenyl)]ethanol |
| | | 2-[4-(2-chloro-6-fluorobenzyloxy)phenyl)]ethanol |
| | | 2-[4-(2-bromo-4-fluorobenzyloxy)phenyl)]ethanol |
| | | 2-[4-(2-fluoro-4-bromobenzyloxy)phenyl)]ethanol |
| | 3 | 2-[4-(2,4,5-trifluorobenzyloxy)phenyl)]ethanol |
| Methoxy group | 1 | 2-[4-(4-methoxybenzyloxy)phenyl)]ethanol |
| | | 2-[4-(3-methoxybenzyloxy)phenyl)]ethanol |
| | 2 | 2-[4-(3,5-dimethoxybenzyloxy)phenyl)]ethanol |

Various dicarboxylic acid ester compounds are obtained by combining the above-described dicarboxylic acids and 2-(4-benzyloxyphenyl)ethanol or substituted 2-(4-benzyloxyphenyl)ethanol. By using them as the component (C), thermochromic coloring color-memory compositions having discoloration characteristics suitable for various applications can be obtained.

When the above-described compound is used, the resulting composition has a maximum hysteresis width almost equal to or greater than that of the conventional thermochromic coloring color-memory composition using an ester compound. Specifically, the maximum hysteresis width ($\Delta H$) is from 8 to 110° C. and is from 40 to 110 as a wider maximum hysteresis width.

The composition having such a maximum hysteresis width is excellent in the function of selectively retaining either one of a color on the lower temperature side and a color on the higher temperature side with a discoloration temperature as a border. It can therefore be used for a wide variety of applications.

The following specifically show the compounds represented by the above-described formula (1).

[Chem 4]

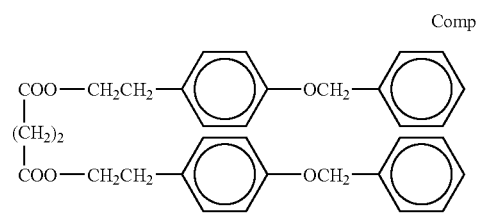

Compound 1

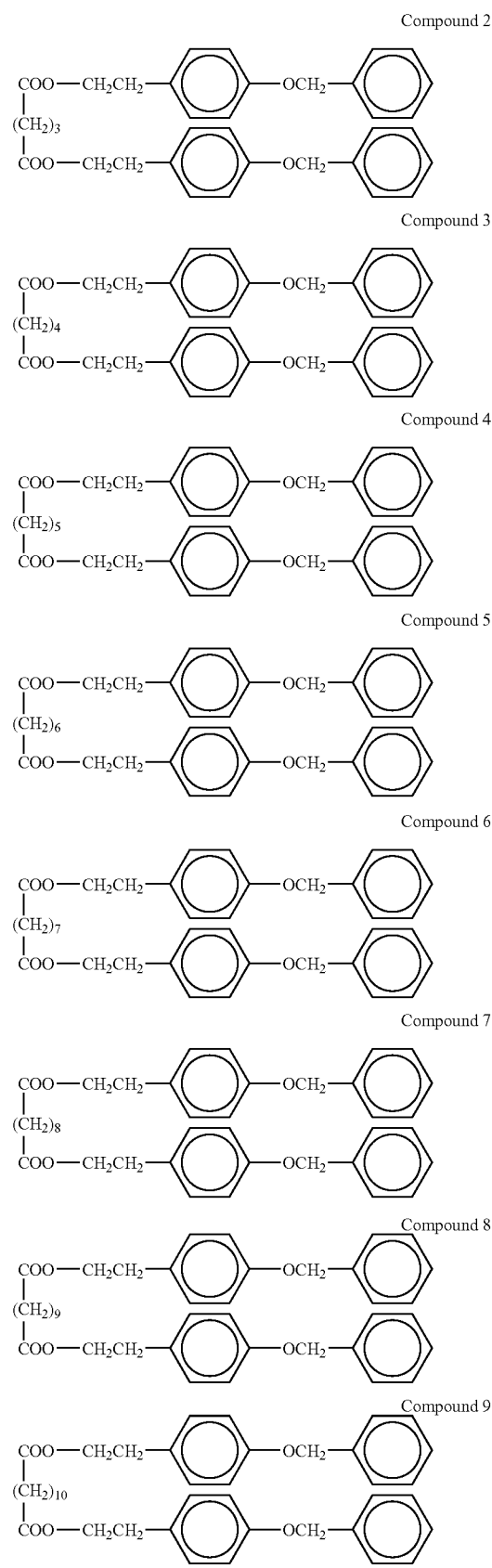

Compound 2

Compound 3

Compound 4

Compound 5

Compound 6

Compound 7

Compound 8

Compound 9

Compound 10
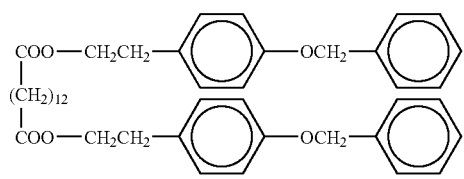
Compound 11
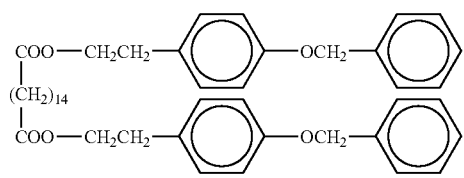
Compound 12
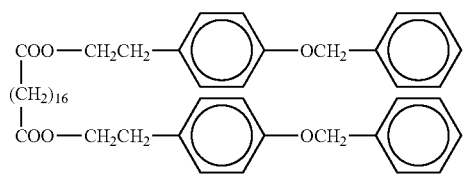
Compound 13
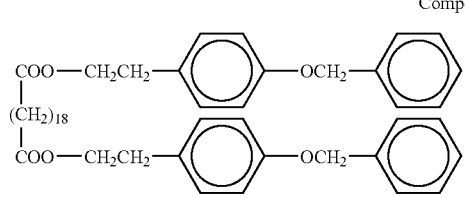
Compound 14
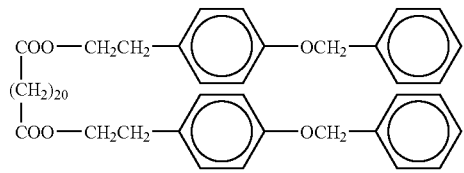
[Chem 5]
Compound 15
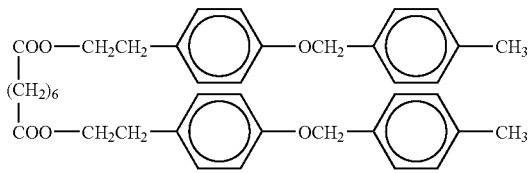
Compound 16
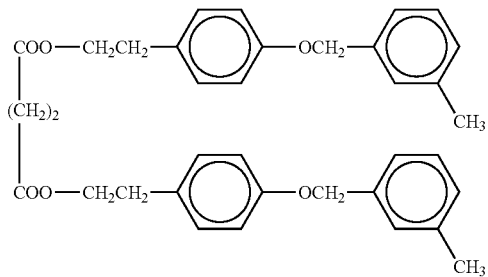
Compound 17
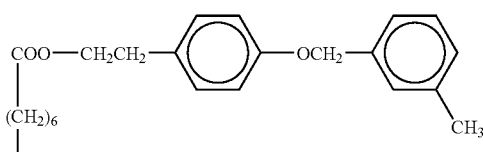
Compound 18
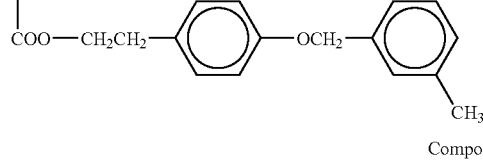
Compound 19
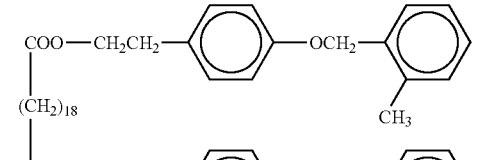
Compound 20
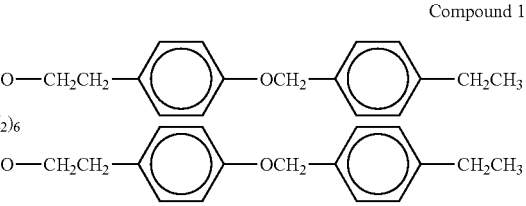
Compound 21
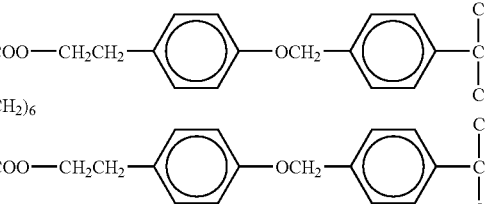
Compound 22
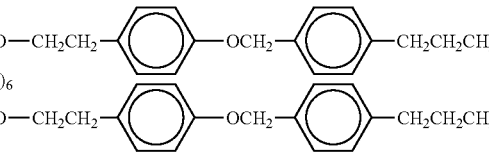
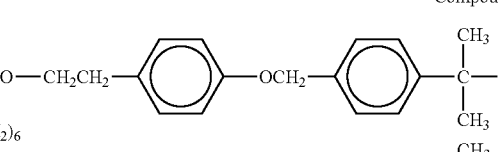

Compound 23
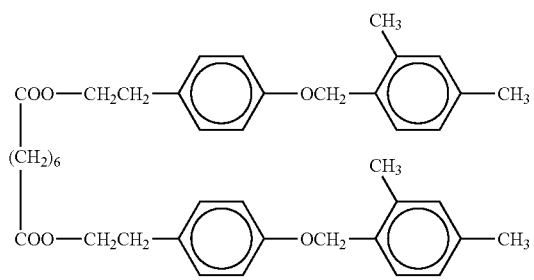
Compound 24
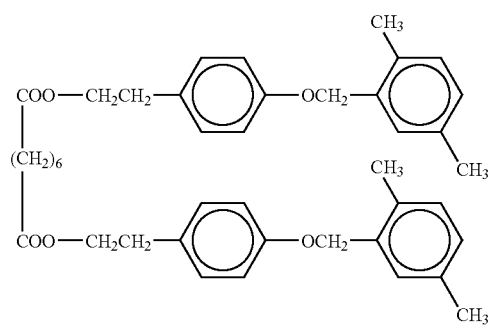
[Chem 6]
Compound 25
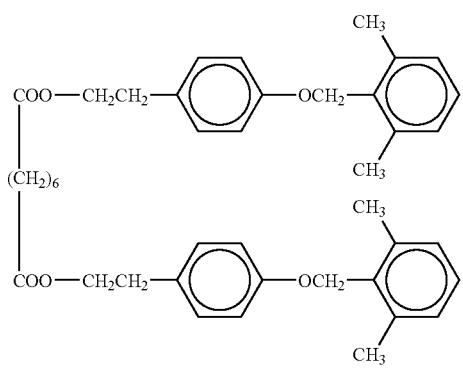
Compound 26
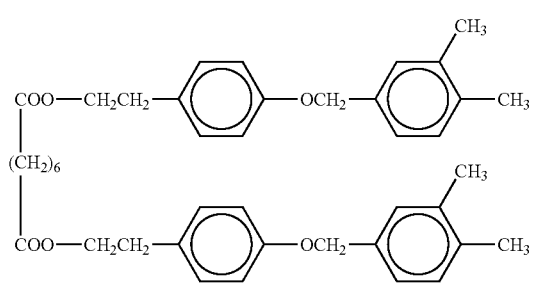
Compound 27
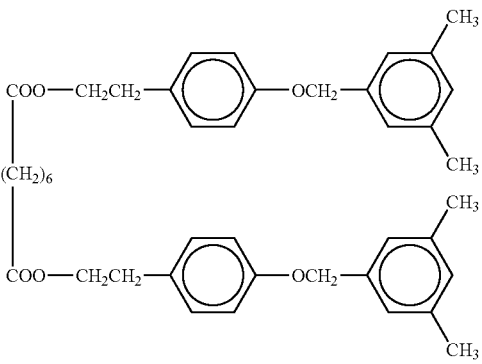
Compound 28
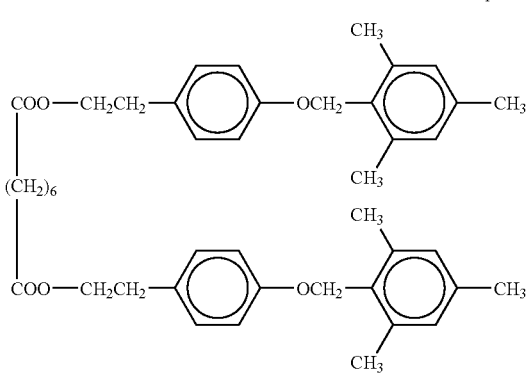
Compound 29
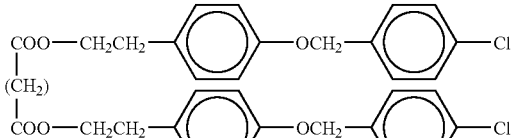
Compound 30
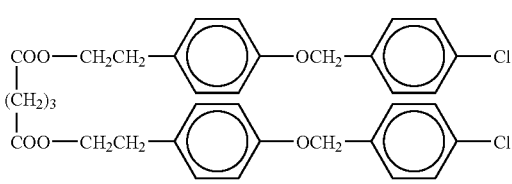
Compound 31
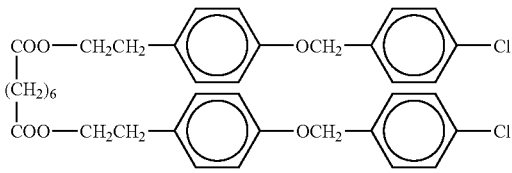
Compound 32
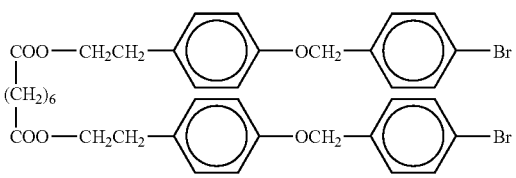

-continued

Compound 33
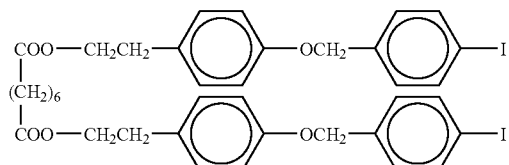

Compound 34
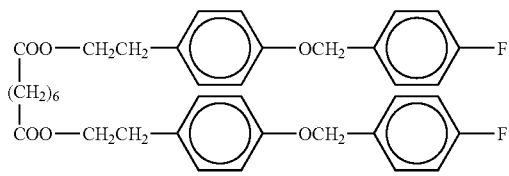

Compound 35
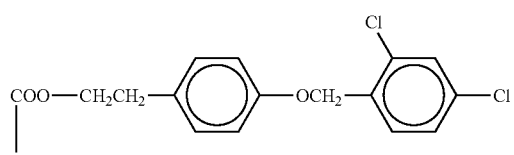

Compound 36
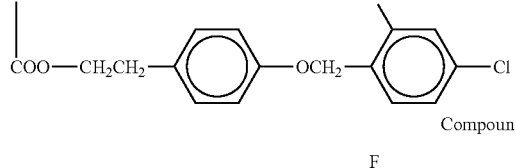

Compound 37
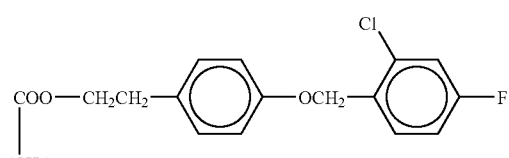

Compound 38
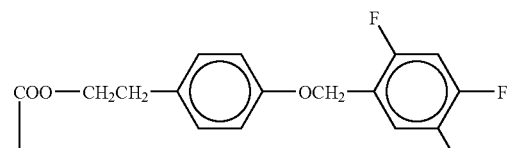
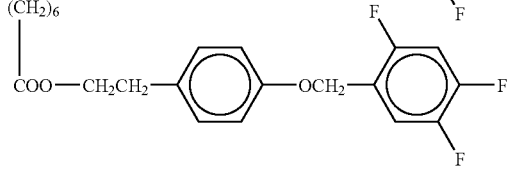

-continued

Compound 39
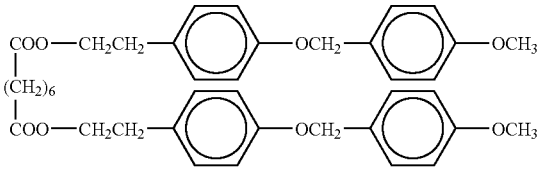

Compound 40
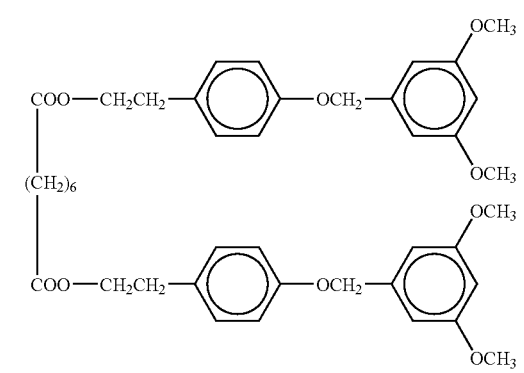

Although the above-described compound is used as the component (C) of the present invention, another compound such as ester, alcohol, carboxylic acid, ketone or amide can be added as needed within a range not causing a great change in the hysteresis characteristic. In this case, it is preferred to add it in an amount of 20 or less (parts by mass) based on 100 of the compound of the invention, in view of effective exhibition of a desired color memory effect.

A homogeneous solubilized mixture composed of the above-described three components can be encapsulated in microcapsules to form a reversible thermochromic microcapsule pigment. By protecting the mixture with a capsule membrane wall, not only its function does not deteriorate even if it is brought into contact with a chemically active substance such as acidic substance, basic substance or peroxide, or another solvent component but also the mixture has improved heat stability.

Moreover, it is possible to provide the microcapsules for practical use after imparting durability thereto by forming a secondary resin film on their surface or modifying their surface properties.

The above-described microcapsules satisfy the practicality when their average particle size is within a range of from 0.5 to 50 μm, preferably from 1 to 30 μm, more preferably from 1 to 20 μm.

When a system of the above-described microcapsules has a maximum outer diameter exceeding 50 μm on average, it lacks in dispersion stability and processing suitability in blending into inks, paints or thermoplastic resins.

On the other hand, when the system has a maximum outer diameter of 0.5 μm or less on average, high density coloring is hardly attained.

By reducing the size of the microcapsules, ΔH can be widened further as compared with the ΔH of the homogeneous solubilized mixture of the three necessary components.

The above-described microcapsules are effective when an encapsulated body/wall membrane ratio falls within a range of 7/1 to 1/1 (mass ratio). The ratio of the wall membrane exceeding the above-described range inevitably causes deterioration in the color density and vividness during color development. The encapsulated body/wall membrane ratio falling within a range of from 6/1 to 1/1 (mass ratio) is preferred.

Examples of the microencapsulation method include conventionally known isocyanate interfacial polymerization, in situ polymerization of melamine-formalin system or the like, submerged coat hardening, phase separation from aqueous solution, phase separation from organic solvent, melt dispersion cooling, aerial suspension coating, and spray drying. It can be selected as needed, depending on the use purpose.

An ordinarily employed dyestuff or pigment (non-thermochromic one) may be added to the microcapsule pigment to cause discoloration behavior from a color (1) to a color (2).

The above-described thermochromic coloring color-memory composition or thermochromic coloring color-memory microcapsule pigment containing the composition can be used, after dispersed in a vehicle containing water and/or an organic solvent and various additives if necessary, as a thermochromic coloring color-memory liquid composition for printing ink to be used in screen printing, offset printing, process printing, gravure printing, coater or pad application, a paint to be used in brush coating, spray coating, electrostatic coating, electro-deposition coating, flow coating, roller coating or dip coating, an ink for ink jet use, a UV curable ink, an ink for use in writing or coating implements such as marking pen, ball-point pen, fountain pen and writing brush pen, and a coloring liquid for use in crayon, colors, cosmetics or fibers.

Various additives can be added to the above-described liquid composition. Examples of thereof include resins, crosslinking agents, curing agents, desiccants, plasticizers, viscosity regulators, dispersing agents, ultraviolet absorbents, antioxidants, light stabilizers, anti-settling agents, lubricants, gelling agents, antifoaming agents, flatting agents, penetrating agents, pH regulators, foaming agents, coupling agents, humectants, fungicides, antiseptics and anticorrosive agents.

Using the above-described liquid composition, a reversible thermochromic layer is provided on a support of any of various material and shapes, whereby a thermochromic coloring color-memory laminate is formed.

The above-described reversible thermochromic layer is a layer formed by evaporation of the solvent in the liquid composition and composed of the other components (additives) and thus the above-described microcapsule pigment is fixed to a resin in a dispersed state.

The material of the support on which the above-described liquid composition is applied is not limited and every material is effective, and its examples include paper, synthetic paper, fiber, fabric, nonwoven fabric, synthetic leather, leather, plastics, glass, pottery materials, metals, wood and stone, which may be not only in a flat shape but also in an irregular form.

In the case where a non-thermochromic coloring layer (including an image) has been formed in advance on the above-described support, the coloring layer can be in-visualized by a temperature change, so that the changing mode can be further varied.

Moreover, in addition to the formation of the reversible thermochromic layer on the support using the above-described liquid composition, it is also possible to form the reversible thermochromic layer on the support using a transfer sheet on which the reversible thermochromic layer is provided in advance.

In addition, the above-described thermochromic coloring color-memory microcapsule pigment can each be melt-blended with a thermoplastic resin, thermosetting resin, wax or the like and used as a resin composition for thermochromic coloring color-memory molding in the form of pellet, powder or paste.

Using the above-described resin for molding, three-dimensional moldings of any shape, or moldings such as films, sheets, plates, filaments, rods or pipes are obtained by a conventional means such as injection molding, extrusion molding, blow molding or cast molding.

An ordinarily employed dyestuff or pigment (non-thermochromic one) may be added to the above-described liquid composition or resin composition for molding to cause discoloration behavior from a color (1) to a color (2).

By stacking a layer containing a light stabilizer and/or transparent metalescent pigment over a laminated product or a molded product formed using the above-described liquid resin composition, light resistance of the product can be improved. It is also possible to improve the durability of the product by laying a topcoat layer thereon.

As the light stabilizer, a UV absorbent, an antioxidant, a singlet oxygen quencher, a superoxide anion quencher, and an ozone quencher can be exemplified.

As the transparent metalescent pigment, a pigment prepared by coating the surface of a core substance such as natural mica, synthetic mica, glass piece, alumina or a piece of a transparent film with a metal oxide such as titanium oxide can be exemplified.

Specific examples of the product prepared using the above-described thermochromic coloring color-memory composition or thermochromic coloring color-memory microcapsule pigment containing the composition include doll- or animal-figured toys, hair for a doll- or animal figured toy, doll accessories such as house, furniture, clothing, hat, bag and shoes for a doll, accessory toys, stuffed dolls, painting toys, picture books for toys, puzzle toys such as a jigsaw puzzle, toy bricks, block toys, clay toys, fluid toys, tops, kites, musical instrument toys, cooking toys, gun toys, capturing toys, background toys, toys imitating vehicles, animals, plants, buildings and food articles, clothes such as a T-shirt, a sweet shirt, a blouse, a dress, a bathing suit, a raincoat and a skiwear, footwear such as shoes and shoelaces, personal effects made of cloth such as a handkerchief, a towel and a wrapping cloth, interior ornaments such as a rug, a curtain, a curtain cord, a tablecloth, a carpet, a cushion, a picture frame and an imitation flower, bedding such as bedclothes, a pillow and a mattress, accessories such as a ring, a bracelet, a tiara, earrings, a hair stopper, an attaching nail, a ribbon and a scarf, stationary such as a writing implement, a stamp, an eraser, a celluloid board, a ruler and an adhesive tape, cosmetics such as a lipstick, an eye shadow, a manicure, a hair dye, an attaching nail and a paint for attaching nail, kitchen utensils such as a glass, a plate, chopsticks, a spoon, a fork, a pot and a frying pan, various printed matters such as a calendar, a label, a card, a recording material and those for forgery prevention, books such as a picture book, gloves, a necktie, a hat, a bag, a container for packing use, embroidery thread, sporting goods, fishing goods, a toothbrush, a coaster, a watch, eyeglasses, lighting fixture, an air conditioner, a musical instrument, a pocket body warmer, a cold reserving agent, a photo stand, bags and pouches such as a purse, an umbrella, furniture, a vehicle, a construction, a temperature detecting indicator and training goods.

EXAMPLES

Examples of the invention will next be described but the invention should not be construed as being limited to these examples.

The preparation process of a thermochromic coloring color-memory composition or a microcapsule pigment containing the same and the measuring method of hysteresis characteristics, depending on a temperature change, of the thermochromic coloring color-memory composition or microcapsule pigment containing the same, in respective examples, will hereinafter be described.

The term "part(s)" in the following examples means part(s) by mass.

Example 1

Preparation Process of Thermochromic Coloring Color-Memory Composition

A thermochromic coloring color-memory composition was obtained by mixing 1 part of 3-(2-ethoxy-4-diethylaminophenyl)-3-(1-ethyl-2-methylindol-3-yl)-4-azaphthalide as the component (A), 2 parts of 2,2-bis(4-hydroxyphenyl)hexafluoropropane as the component (B) and 50 parts of a diester compound (compound 29) of malonic acid and 2-[4-(4-chlorobenzyloxy)phenyl]ethanol as the component (C), followed by heating to homogeneously dissolve them.

The above-described thermochromic coloring color-memory composition changed color from blue to colorless.

Preparation of Measuring Sample

The above-described thermochromic coloring color-memory composition was charged into a transparent glass capillary having an inner diameter of 1 mm and a length of 78 mm to a height of about 10 mm from the bottom of the capillary, whereby a measuring sample was obtained.

Measurement of Discoloration Temperature

The whole part of the measuring sample in which the thermochromic coloring color-memory composition had been charged was immersed in a transparent heat medium. While the temperature of the transparent heat medium was changed, the discoloring state of the thermochromic coloring color-memory composition was visually observed to determine $T_1$ (complete coloring temperature), $T_2$ (coloring starting temperature), $T_3$ (decoloring starting temperature), $T_4$ (complete decoloring temperature), $T_H$ [temperature at a midpoint between $T_1$ and $T_2$; $(T_1+T_2)/2$], $T_G$ [temperature at a midpoint between $T_3$ and $T_4$; $(T_3+T_4)/2$] and $\Delta H$ (maximum hysteresis width; $T_G - T_H$).

The above-described thermochromic coloring color-memory composition showed hysteresis characteristics of $T_1$: 33° C., $T_2$: 42° C., $T_3$: 91° C., $T_4$: 98° C., $T_H$: 37.5° C., $T_G$: 94.5° C., and $\Delta H$: 57° C.

Examples 2 to 20

In the same mixing amounts and in the same manner as in Example 1 except that the components (A), (B) and (C) of the thermochromic coloring color-memory composition were changed to the compounds as listed in the below-described Table 3, thermochromic coloring color-memory compositions of Examples 2 to 20 were prepared and their hysteresis characteristics were measured.

TABLE 3

| Example | Component (A) | Component (B) | Component (C) |
|---|---|---|---|
| 1 | A | a | Compound 29<br>diester of malonic acid and 2-[4-(4-chlorobenzyloxy)phenyl]ethanol |
| 2 | A | a | Compound 1<br>diester of succinic acid and 2-(4-benzyloxyphenyl)ethanol |
| 3 | A | a | Compound 16<br>diester of succinic acid and 2-[4-(3-methylbenzyloxy)phenyl]ethanol |
| 4 | A | a | Compound 2<br>diester of glutaric acid and 2-(4-benzyloxyphenyl)ethanol |
| 5 | B | a | Compound 2<br>diester of glutaric acid and 2-(4-benzyloxyphenyl)ethanol |
| 6 | A | b | Compound 2<br>diester of glutaric acid and 2-(4-benzyloxyphenyl)ethanol |
| 7 | A | a | Compound 30<br>diester of glutaric acid and 2-[4-(4-chlorobenzyloxy)phenyl]ethanol |
| 8 | A | a | Compound 3<br>diester of adipic acid and 2-(4-benzyloxyphenyl)ethanol |
| 9 | B | a | Compound 3<br>diester of adipic acid and 2-(4-benzyloxyphenyl)ethanol |
| 10 | A | b | Compound 3<br>diester of adipic acid and 2-(4-benzyloxyphenyl)ethanol |
| 11 | A | a | Compound 4<br>diester of pimelic acid and 2-(4-benzyloxyphenyl)ethanol |
| 12 | A | a | Compound 5<br>diester of suberic acid and 2-(4-benzyloxyphenyl)ethanol |
| 13 | A | a | Compound 17<br>diester of suberic acid and 2-[4-(3-methylbenzyloxy)phenyl]ethanol |
| 14 | A | a | Compound 31<br>diester of suberic acid and 2-[4-(4-chlorobenzyloxy)phenyl]ethanol |
| 15 | A | a | Compound 35<br>diester of suberic acid and 2-[4-(2,4-dichlorobenzyloxy)phenyl]ethanol |
| 16 | A | a | Compound 6<br>diester of azelaic acid and 2-(4-benzyloxyphenyl)ethanol |
| 17 | A | a | Compound 7<br>diester of sebacic acid and 2-(4-benzyloxyphenyl)ethanol |
| 18 | A | a | Compound 9<br>diester of 1,10-decanedicarboxylic acid and 2-(4-benzyloxyphenyl)ethanol |

TABLE 3-continued

| Example | Component (A) | Component (B) | Component (C) |
|---|---|---|---|
| 19 | A | a | Compound 13 diester of 1,18-octadecanedicarboxylic acid and 2-(4-benzyloxyphenyl)ethanol |
| 20 | A | a | Compound 18 diester of 1,18-octadecanedicarboxylic acid and 2-[4-(2-methylbenzyloxy)phenyl)]ethanol |

A of the component (A) in the table is 3-(2-ethoxy-4-diethylaminophenyl)-3-(1-ethyl-2-methylindol-3-yl)-4-azaphthalide and B thereof is 1,2-benz-6-diethylaminofluoran, and a of the component (B) in the table is 2,2-bis(4-hydroxyphenyl)hexafluoropropane and b thereof is 1,1-bis(4-hydroxyphenyl)-2-methylpropane.

A color change and values of $T_1$, $T_2$, $T_3$, $T_4$, $T_H$, $T_G$ and $\Delta H$ of the thermochromic coloring color-memory compositions of Examples 1 to 20 are shown in the below-described Table 4.

TABLE 4

| | Color change | Thermochromic characteristic (° C.) | | | | | | |
|---|---|---|---|---|---|---|---|---|
| Example | At coloring <--> At decoloring | $T_1$ | $T_2$ | $T_3$ | $T_4$ | $T_H$ | $T_G$ | $\Delta H$ |
| 1 | blue <--> Colorless | 33 | 42 | 91 | 98 | 37.5 | 94.5 | 57 |
| 2 | blue <--> Colorless | 99 | 100 | 112 | 121 | 99.5 | 116.5 | 17 |
| 3 | blue <--> Colorless | 53 | 54 | 84 | 95 | 53.5 | 89.5 | 36 |
| 4 | blue <--> Colorless | 41 | 42 | 86 | 97 | 41.5 | 91.5 | 50 |
| 5 | pink <--> Colorless | 36 | 38 | 85 | 95 | 37 | 90 | 53 |
| 6 | blue <--> Colorless | 44 | 45 | 82 | 93 | 44.5 | 87.5 | 43 |
| 7 | blue <--> Colorless | 89 | 90 | 115 | 126 | 89.5 | 120.5 | 31 |
| 8 | blue <--> Colorless | 83 | 84 | 88 | 99 | 83.5 | 93.5 | 10 |
| 9 | pink <--> Colorless | 62 | 63 | 83 | 96 | 62.5 | 89.5 | 27 |
| 10 | blue <--> Colorless | 63 | 64 | 82 | 93 | 63.5 | 87.5 | 24 |
| 11 | blue <--> Colorless | 45 | 46 | 76 | 85 | 45.5 | 80.5 | 35 |
| 12 | blue <--> Colorless | 80 | 82 | 93 | 103 | 81 | 98 | 17 |
| 13 | blue <--> Colorless | 26 | 27 | 62 | 71 | 26.5 | 66.5 | 40 |
| 14 | blue <--> Colorless | 83 | 84 | 94 | 105 | 83.5 | 99.5 | 16 |
| 15 | blue <--> Colorless | 72 | 81 | 85 | 96 | 76.5 | 90.5 | 14 |
| 16 | blue <--> Colorless | 57 | 58 | 71 | 86 | 57.5 | 78.5 | 21 |
| 17 | blue <--> Colorless | 68 | 69 | 84 | 95 | 68.5 | 89.5 | 21 |
| 18 | blue <--> Colorless | 70 | 71 | 74 | 95 | 70.5 | 84.5 | 14 |
| 19 | blue <--> Colorless | 85 | 86 | 93 | 104 | 85.5 | 98.5 | 13 |
| 20 | blue <--> Colorless | 55 | 62 | 58 | 75 | 58.5 | 66.5 | 8 |

Example 21

Preparation Process of Thermochromic Coloring Color-Memory Microcapsule Pigment

A thermochromic coloring color-memory composition composed of 1 part of 3-(2-ethoxy-4-diethylaminophenyl)-3-(1-ethyl-2-methylindol-3-yl)-4-azaphthalide as the component (A), 5 parts of 2,2-bis(4-hydroxyphenyl)hexafluoropropane as the component (B) and 50 parts of a diester compound (compound 3) of adipic acid and 2-(4-benzyloxyphenyl)ethanol as the component (C) was mixed and homogeneously heated to dissolve them. A solution obtained by further mixing 20 parts of an aromatic polyvalent isocyanate prepolymer as a wall membrane material and 40 parts of ethyl acetate was charged into 100 parts of a 15% aqueous gelatin solution and emulsified and dispersed to form micro-droplets. After the above-described dispersion was continued stirring at 70° C. for about 1 hour, an aqueous solution of 2 parts of a water-soluble amine compound (manufactured by Japan Epoxy Resins Co., Ltd., trade name: jER cure U, amine adduct of epoxy resin) dissolved in 23 parts of water was gradually added thereto and stirring was continued for about 3 hours with maintaining the liquid temperature at 90° C. to obtain a thermochromic coloring color-memory microcapsule pigment suspension.

By isolating the microcapsule pigment from the above-described microcapsule pigment suspension by centrifugal separation, a thermochromic coloring color-memory microcapsule pigment changing color from blue to colorless was obtained (average particle size: 6 μm).

Preparation of Measuring Sample

A thermochromic coloring color-memory ink was prepared by dispersing 40 parts by weight of the above-described thermochromic coloring color-memory microcapsule pigment in an aqueous ink vehicle composed of 50.0 parts of an ethylene-vinyl acetate emulsion, 1.0 part of a leveling agent, 1.0 part of an antiforming agent, 0.5 part of a viscosity regulator, and 7.5 parts of water. A measuring sample was obtained by screen-printing a solid pattern on a white synthetic paper with the above-described ink and laminating on the printed surface a transparent polyester film (thickness: 16 μm) having a pressure-sensitive adhesive layer on the reverse side.

Measurement of Discoloration Temperature

The measuring sample was immersed in a transparent heat medium and, while the temperature of the transparent heat medium was changed, the discoloring state of the portion printed with the thermochromic coloring color-memory microcapsule pigment was visually observed to measure $T_1$, $T_2$, $T_3$ and $T_4$, and determined $T_H$ [temperature at a midpoint between $T_1$ and $T_2$; $(T_1+T_2)/2$], $T_G$ [temperature at a midpoint between $T_3$ and $T_4$; $(T_3+T_4)/2$] and $\Delta H$ (maximum hysteresis width; $T_G-T_H$).

The above-described thermochromic coloring color-memory microcapsule pigment showed hysteresis characteristics of $T_1$: 4° C., $T_2$: 14° C., $T_3$: 77° C., $T_4$: 85° C., $T_H$: 9° C., $T_G$: 81° C., and $\Delta H$: 72° C.

Examples 22 to 29

In the same mixing amounts and in the same manner as in Example 21 except that the components (A), (B) and (C) of the thermochromic coloring color-memory composition were changed to the compounds as listed in the below-described Table 5, thermochromic coloring color-memory microcapsule pigments of Examples 22 to 29 were prepared and their hysteresis characteristics were measured as in Example 21.

TABLE 5

| Example | Component (A) | Component (B) | Component (C) |
|---|---|---|---|
| 21 | A | a | Compound 3<br>diester of adipic acid and 2-(4-benzyloxyphenyl)ethanol |
| 22 | B | a | Compound 3<br>diester of adipic acid and 2-(4-benzyloxyphenyl)ethanol |
| 23 | C | a | Compound 3<br>diester of adipic acid and 2-(4-benzyloxyphenyl)ethanol |
| 24 | A | a | Compound 4<br>diester of pimelic acid and 2-(4-benzyloxyphenyl)ethanol |
| 25 | A | a | Compound 5<br>diester of suberic acid and 2-(4-benzyloxyphenyl)ethanol |
| 26 | A | a | Compound 6<br>diester of azelaic acid and 2-(4-benzyloxyphenyl)ethanol |
| 27 | A | a | Compound 7<br>diester of sebacic acid and 2-(4-benzyloxyphenyl)ethanol |
| 28 | A | a | Compound 9<br>diester of 1,10-decanedicarboxylic acid and 2-(4-benzyloxyphenyl)-ethanol |
| 29 | A | a | Compound 18<br>diester of 1,18-octadecanedicarboxylic acid and 2-[4-(2-methylbenzyloxy)phenyl)]ethanol |

A of the component (A) in the table is 3-(2-ethoxy-4-diethylaminophenyl)-3-(1-ethyl-2-methylindol-3-yl)-4-azaphthalide, B thereof is 1,2-benz-6-diethylaminofluoran, and C thereof is 2-N,N-dibenzylamino-6-diethylaminofluoran, and a of the component (B) in the table is 2,2-bis(4-hydroxyphenyl)hexafluoropropane.

A color change and values of $T_1$, $T_2$, $T_3$, $T_4$, $T_H$, $T_G$ and $\Delta H$ of the thermochromic coloring color-memory microcapsule pigments of Examples 21 to 29 are shown in the below-described Table 6.

TABLE 6

| | Color change | Thermochromic characteristic (° C.) | | | | | | |
|---|---|---|---|---|---|---|---|---|
| Example | At coloring <--> At decoloring | $T_1$ | $T_2$ | $T_3$ | $T_4$ | $T_H$ | $T_G$ | $\Delta H$ |
| 21 | blue <--> Colorless | 4 | 14 | 77 | 85 | 9 | 81 | 72 |
| 22 | pink <--> Colorless | 6 | 20 | 74 | 86 | 13 | 80 | 67 |
| 23 | green <--> Colorless | 6 | 20 | 74 | 86 | 13 | 80 | 67 |
| 24 | blue <--> Colorless | −10 | 1 | 70 | 79 | −4.5 | 74.5 | 79 |
| 25 | blue <--> Colorless | 12 | 17 | 84 | 97 | 14.5 | 90.5 | 76 |
| 26 | blue <--> Colorless | 13 | 18 | 70 | 79 | 15.5 | 74.5 | 59 |
| 27 | blue <--> Colorless | 25 | 36 | 78 | 85 | 30.5 | 81.5 | 51 |
| 28 | blue <--> Colorless | 37 | 45 | 78 | 86 | 41 | 82 | 41 |
| 29 | pink <--> Colorless | 44 | 49 | 56 | 69 | 46.5 | 62.5 | 16 |

Application Example 1

A thermochromic coloring color-memory ink was prepared by homogeneously dispersing 2.5 parts of the thermochromic coloring color-memory microcapsule pigment prepared in Example 21 and 1.5 parts of a non-thermochromic fluorescent pink pigment into an oily ink vehicle composed of 12.5 parts of vinyl chloride-vinyl acetate copolymer resin, 38.3 parts of xylene, 45 parts of butyl acetate, and 0.2 part of a viscosity regulator.

After the above-described ink was cooled to a temperature of 4° C. or lower to change the color to purple, the ink was applied to a plug part (white) of a domestic electric code by spraying to provide a thermochromic layer, whereby a thermochromic coloring color-memory plug was obtained.

The above-described plug showed purple at room temperature (25° C.) but discoloration was started at a temperature of 77° C. or higher by heating and the plug became pink at a temperature of 85° C. or higher. When the plug was cooled from the discolored state, discoloration was started at a temperature of 14° C. or lower and the plug again became purple at a temperature of 4° C. or lower.

The above-described thermochromic coloring color-memory plug can maintain the purple discolored state at a temperature of less than 77° C. When it turned to pink at a temperature of 85° C. or higher, it can maintain the pink discolored state unless it was cooled to a temperature of 14° C. or lower. Accordingly, it was possible to visually detect temperature hysteresis in the case where the plug was abnormally overheated and reached a high-temperature region of 85° C. or higher.

Application Example 2

A thermochromic coloring color-memory ink was prepared by homogeneously dispersing 27 parts of the thermochromic coloring color-memory microcapsule pigment prepared in Example 24 (blue color had been developed beforehand by cooling to −10° C. or lower) into an aqueous ink vehicle composed of 0.33 part of xanthan gum (shear thinning agent), 10.0 parts of urea, 10 parts of glycerin, 0.6 part of a nonionic surfactant, 0.1 parts of a modified silicone antifoaming agent, 0.2 part of an antiseptic and 51.77 parts of water.

Preparation of Writing Implement

A polypropylene pipe having an inner diameter of 4.4 mm was filled by suction with 0.97 g of the above-described ink and connected, via a holder made of a resin, with a ball-point pen tip holding a 0.7 mm stainless steel ball inside the tip.

Next, an ink follower (liquid plug) containing polybutene as a main component and having viscoelasticity was filled from the rear end of the polypropylene pipe, and a tail plug was fitted in the rear portion of the pipe. A front axle body and a rear axle body were assembled, a cap was fitted, and then degassing treatment was carried out by centrifugation, whereby a thermochromic coloring color-memory ball-point pen was obtained.

The rear portion of the above rear axle body has a rubber made of SEBS attached as a frictional body.

Using the above-described ball-point pen, a blue letter (handwriting) was formed by writing on a sheet of paper.

The above-described handwriting showed blue at room temperature (25° C.), but the letter discolored and became colorless when the letter was rubbed using the frictional body. This state was kept unless the sheet of paper was cooled to 1° C. or lower.

When the sheet of paper was put in a freezer and cooled to −10° C. or lower, the letter showed a color changing behavior that the letter turned to blue again. Thus, the color changing behavior was reproduced in repetition.

Application Example 3

A thermochromic coloring color-memory ink was prepared by homogeneously dispersing 40 parts by weight of the above-described thermochromic coloring color-memory microcapsule pigment prepared in Example 25 into an aqueous ink vehicle composed of 50 parts of an ethylene-vinyl acetate emulsion, 1 part of a leveling agent, 1 part of an antiforming agent, 0.5 part of a viscosity regulator, and 7.5 parts of water.

A thermochromic coloring color-memory seal was obtained by carrying out screen printing on a white polyester film (thickness: 25 μm) having a pressure-sensitive adhesive layer on the back side with the above-described ink and, after a thermochromic layer was provided, laminating a transparent polyester film (thickness: 16 μm) having a pressure-sensitive adhesive layer on the thermochromic layer.

After the above-described seal was cooled to a temperature of 12° C. or lower to develop blue color, discoloration was started at a temperature of 84° C. or higher by heating and the seal became white at a temperature of 97° C. or higher. When the seal was cooled from the discolored state, discoloration was started at a temperature of 17° C. or lower and the seal showed a color changing behavior that the seal again became blue at a temperature of 12° C. or lower. The color changing behavior could be reproduced in repetition.

When the seal in a blue-colored state was attached to an outer surface of a plastic lunch box and the lunch box was subjected to heat-sterilization treatment at 110° C. for 5 minutes in a hot-water jet-flow sterilizer, the above-described seal maintained the white state even after it was taken out and kept at room temperature (25° C.), so that it was possible to visually confirm the fact that the above-described lunch box had been heated to a temperature of 97° C. or higher and thus temperature hysteresis of the presence of the heat-sterilization treatment could be visually detected.

Application Example 4

Preparation of Microcapsule Particles 5.0 parts of 2,2-bis(4-hydroxyphenyl)hexafluoropropane and 50 parts of butyl palmitate was homogeneously heated to dissolve them. A solution obtained by further mixing 20 parts of an aromatic polyvalent isocyanate prepolymer as a wall membrane material and 40 parts of ethyl acetate was charged into 100 parts of a 15% aqueous gelatin solution and emulsified and dispersed to form micro-droplets. After the above dispersion was continued stirring at 70° C. for about 1 hour, an aqueous solution of 2 parts of a water-soluble amine compound (manufactured by Japan Epoxy Resins Co., Ltd., trade name: jER cure U, amine adduct of epoxy resin) dissolved in 23 parts of water was gradually added thereto with stirring and stirring was continued for about 3 hours with maintaining the liquid temperature at 90° C. to obtain a suspension of microcapsule particles.

The microcapsule particles were isolated by centrifuging the above-described suspension (average particle size: 6 μm).

Preparation of Ink for Writing Implement

A thermochromic coloring color-memory ink was prepared by homogeneously dispersing 13 parts of the thermochromic coloring color-memory microcapsule pigment prepared in Example 26 (blue color had been developed beforehand by cooling to 13° C. or lower) and 7 parts of the above-described microcapsule particles into an aqueous ink vehicle composed of 0.5 part of hydroxyethyl cellulose, 15 parts of glycerin, 0.2 parts of an antifoaming agent, 1 part of an antiseptic and 63.3 parts of water.

Preparation of Writing Implement

The above-described ink and a stirring ball (ferrite stainless steel ball, diameter: 3 mm) were included in a barrel and a marking pen body [chisel-type fiber pen body (porosity: 53%)] was attached to the front end via a valve mechanism to obtain a direct liquid-type writing implement (marking pen).

The above-described valve mechanism comprises a valve body and a metal spring which impels the valve body to come into contact with a valve seat with pressure and has a structure that the valve is opened by a tool pressure to the pen body during writing.

A detachable cap was provided on the above-described direct liquid-type writing implement and the above-described cap has, on the apex thereof, SEBS resin mounted as a frictional body.

Using the above-described ball-point pen, a blue letter (handwriting) was formed by writing on a sheet of paper.

The above-described handwriting showed blue at room temperature (25° C.), but the letter discolored and became colorless when the letter was rubbed using the frictional body. This state was kept under room temperature but the color was returned to original blue by cooling the sheet of paper to 13° C. or lower. Thus, the color changing behavior was reproduced in repetition.

Application Example 5

A thermochromic coloring color-memory ink was prepared by homogeneously dispersing 40 parts of the thermochromic coloring color-memory microcapsule pigment prepared in Example 24 (blue color had been developed beforehand by cooling to −10° C. or lower) into an aqueous ink vehicle composed of 50 parts of a urethane resin emulsion, 1 part of an antifoaming agent, 1 part of a viscosity regulator and 8 parts of water.

The above-described aqueous ink was applied on an A4 size white synthetic paper (thickness: 200 μm) for coating to provide a thermochromic layer having a thickness of 20 μm, whereby a thermochromic coloring color-memory recording material was obtained.

A letter was printed on the above-described recording material by a thermal transfer printer (product number: S4870, manufactured by Showa Information Systems), and the resulting recording material was put into practical use as a guide board.

A white letter with a blue background was clearly visually recognized on the above-described guide board. The discolored state could be maintained in a temperature range of from 1° C. to 70° C. and the above-described letter could be kept under room temperature.

With regard to the above-described guide board, it was possible to erase the letter portion by causing color development of the thermochromic layer at the letter portion again by cooling the board to −10° C. or lower and it was possible to form a different letter in repetition by means of the thermal transfer printer.

Application Example 6

Thermochromic coloring color-memory pellets were obtained by melt-mixing 5 parts of the thermochromic coloring color-memory microcapsule pigment prepared in Example 29, 1 part of a dispersant, 0.1 part of a non-thermochromic pink pigment, and 93.9 parts of polypropylene homopolymer in an extruder at 180° C. Using the above-described pellets, a plastic cup was molded out in an injection-molding machine at a cylinder temperature of 180° C. The above-described plastic cup showed purple at room temperature (25° C.) but discoloration was started at a temperature of 56° C. or higher by heating and the color became pink at a temperature of 69° C. or higher. When the cup was cooled from the state, discoloration was started at a temperature of 49° C. or lower and the color became purple again at a temperature of 44° C. or lower.

When a drink was placed in the above-described plastic cup and heated in a microwave oven, the cup was discolored from purple to pink and thus it was possible to easily confirm that the inside drink was heated to a temperature of 69° C. or higher. When the above-described plastic cup discolored to pink by heating was taken out of the microwave oven and allowed to stand at room temperature, the cup was again discolored from pink to purple and thus it was possible to easily confirm that the drink in the cup was cooled to a temperature of 44° C. or lower.

Application Example 7

A thermochromic coloring color-memory ink was prepared by homogeneously dispersing 20 parts of the thermochromic coloring color-memory microcapsule pigment prepared in Example 24 (blue color had been developed beforehand by cooling to −10° C. or lower) into an aqueous ink vehicle composed of 78.0 parts of an acrylic resin emulsion (solid content: 40%) and 2.0 parts of an antifoaming agent.

A forgery-judging mark was printed by gravure printing with the above-described thermochromic coloring color-memory ink on a gift certificate printed on a bond paper with a black non-thermochromic ink. The above-described forgery-judging mark showed blue at room temperature (25° C.) and the color was not changed by body temperature or environmental temperature. However, when it was heated to 79° C. or higher, it became colorless and when cooled to −10° C. or lower, it again became blue.

Since the above-described forgery-judging mark of the gift certificate showed blue and no color change was observed in a room temperature range, it was impossible to discriminate it to be a forgery-judging mark but it became colorless when heated to 79° C. or higher, so that it had a forgery-preventing function.

Application Example 8

Thermochromic coloring color-memory pellets were obtained by melt-mixing 5 parts of the thermochromic coloring color-memory microcapsule pigment prepared in Example 24, 46.5 parts of vinyl chloride resin, 46.4 parts of a plasticizer for vinyl chloride resin, 1 part of a stabilizer, 1 part of a dispersant, and 0.1 part of a non-thermochromic pink pigment in an extruder.

After the above-described pellets were extruded and molded to coat a copper wire, the resulting coated wire was cooled to −10° C. or lower to change the color from pink to purple, whereby a thermochromic coloring color-memory electric wire was obtained. The above-described electric wire showed purple at room temperature (25° C.) and the color was not changed by body temperature or environmental temperature. However, when it was heated to 79° C. or higher, it became pink and when cooled to −10° C. or lower, it again became purple.

When a heat generation trouble test by overcurrent was carried out on the above-described electric wire, it was discolored to pink only at a abnormally heat-generated portion caused by breaking of wire and the discolored portion maintains the pink state in a room temperature range even after the current was closed, so that it was possible to easily specify the broken portion of the wire visually.

Application Example 9

A thermochromic coloring color-memory film having a thickness of 200 μm was obtained by mixing 5 parts of the thermochromic coloring color-memory microcapsule pigment prepared in Example 24 with 62 parts of vinyl chloride resin, 31 parts of a plasticizer for vinyl chloride resin, 1.9 parts of a dispersant, and 0.1 part of a non-thermochromic pink pigment and subsequently molding the mixture into a film by means of a calendar extrusion molding machine. After a pressure-sensitive adhesive was applied on one side of the above-described film by means of a bar coater and the coated film was wound in a roll shape, the resulting film was cooled to −10° C. or lower to change the color from pink to purple, whereby a thermochromic coloring color-memory pressure-sensitive adhesive tape was obtained.

The above-described pressure-sensitive adhesive tape showed purple at room temperature (25° C.) and the color was not changed by body temperature or environmental temperature. However, when heated to 79° C. or higher, it became pink and thus it was possible to easily confirm abnormal heat generation caused by defective connection of an electric wire visually when the film was wound on a connecting portion of the electric wire.

Application Example 10

A thermochromic coloring color-memory ink was prepared by homogeneously dispersing 30 parts of the thermochromic coloring color-memory microcapsule pigment prepared in Example 24 (blue color had been developed beforehand by cooling to −10° C. or lower) into an aqueous ink vehicle composed of 60 parts of an acrylic resin emulsion (solid content: 45%), 1 part of a viscosity regulator, 0.2 part of an antifoaming agent and 8.8 part of water. Using the above-described aqueous ink, a large number of star patterns were screen-printed on a white T-shirt (made of cotton) with a 100 mesh screen plate and the shirt was dried at 50° C., whereby a thermochromic coloring color-memory T-shirt.

On the above-described T-shirt, a large number of blue star patterns were visually observed at room temperature (25° C.) and the patterns were not changed by body temperature or environmental temperature. However, when the shirt was heated to 79° C. or higher, the star pattern portion became colorless and when cooled to −10° C. or lower, the blue star patterns were again visually observed.

It was possible to optionally change the pattern of the T-shirt by forming an outlined pattern where a part of the star patterns on the above-described T-shirt was decolored by heating with an iron or the like to decolor only arbitrary star(s) or a pattern of a letter written with the star parts. Moreover, the discolored state could be maintained in a room temperature range and, after the star pattern portion was wholly decolored by heating the whole to 79° C. or higher, it was possible to form an optional pattern again as above by cooling the shirt to −10° C. or lower to develop color on the whole portion of the star patterns.

Application Example 11

A thermochromic coloring color-memory ink was prepared by homogeneously dispersing 20 parts of a thermochromic coloring color-memory microcapsule pigment (blue color had been developed beforehand by cooling to −10° C. or lower), which was the same as that in Example 24 except that the average particle size was adjusted to 2.5 μm, into an aqueous ink vehicle composed of 5 parts of an styrene-acrylic copolymer resin emulsion (solid content: 45%), 10 parts of glycerin, 0.2 part of an antiseptic, 0.1 part of an antifoaming agent and 64.7 part of water.

The above-described ink was set on an ink-jet recording apparatus and printing was performed on a recording paper to form a thermochromic image, whereby a thermochromic printed matter was obtained.

On the above-described printed matter, a blue thermochromic image was visually observed at room temperature (25° C.) and the image was not changed by body temperature or environmental temperature. However, when the printed matter was heated to 79° C. or higher, the thermochromic image was decolored and the printed matter was returned to a state before use (non-printed recording paper) in a room temperature range.

By again performing printing with setting the above-described printing paper on the ink-jet recording apparatus, it was possible to form a thermochromic image to obtain a printed matter and thus the printing paper could be used in repetition.

In addition, it was also possible to additionally write a letter or the like using the thermochromic coloring color-memory ball-point pen obtained in Application Example 2 on the printed matter where the above-described thermochromic image had been formed. Also, by heating the printed matter to 79° C. or higher to decolor the thermochromic image and the additionally written portion and to return the printed matter to a state before use (non-printed recording paper), it was possible to re-use the recording paper on the ink-jet recording apparatus in repetition.

While the invention has been described in detail and with reference to specific embodiments thereof, it will be apparent to one skilled in the art that various changes and modifications can be made therein without departing from the spirit and scope thereof.

The present application is based on Japanese Patent Application No. 2007-104391 filed on Apr. 12, 2007 and Japanese Patent Application No. 2008-067464 filed on Mar. 17, 2008, and the contents are incorporated herein by reference.

INDUSTRIAL APPLICABILITY

According to the present invention, it is possible to cause reversible discoloration of coloring and decoloring showing a broad maximum hysteresis width (ΔH) regarding a color density-temperature curve, alternately memorize and keep both of the color on the low temperature side and the color on the high temperature side with the discoloration temperature as a border, and effectively produce a characteristic that either of the colors can be reversibly reproduced, memorized and maintained by applying a heat or cold as needed, so that a thermochromic coloring color-memory composition having applicability to various fields such as thermo-color materials, ornaments, toys and training elements and a thermochromic coloring color-memory microcapsule pigment containing the composition can be provided.

The invention claimed is:

1. A thermochromic coloring color-memory composition comprising a homogeneous solubilized mixture of (A) an electron donative coloring organic compound, (B) an electron accepting compound and (C) a compound represented by the following formula (I) as a reaction medium which controls color reactions of the components (A) and (B):

[Chem 1]

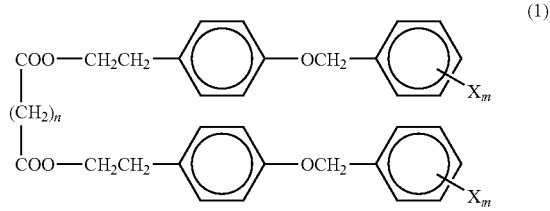

wherein X represents any of a hydrogen atom, an alkyl group having 1 to 4 carbon atoms, a methoxy group, and a halogen atom, m represents an integer of from 1 to 3, and n represents an integer of from 1 to 20.

2. A thermochromic coloring color-memory microcapsule pigment containing the thermochromic coloring color-memory composition of claim 1.

3. The thermochromic coloring color-memory microcapsule pigment according to claim 2, which discolors, showing a maximum hysteresis width of from 8° C. to 110° C. regarding a color density-temperature curve.

4. The thermochromic coloring color-memory microcapsule pigment according to claim 2 or 3, wherein the pigment has a complete decoloring temperature ($T_4$) of 40° C. or higher and a coloring starting temperature ($T_2$) of 20° C. or lower regarding the color density-temperature curve, and wherein the pigment has color-memory ability at the ordinary temperature range.

5. A thermochromic coloring color-memory liquid composition comprising the thermochromic coloring color-memory microcapsule pigment according to claim 2 and a vehicle.

6. A thermochromic coloring color-memory resin composition for molding, comprising the thermochromic coloring color-memory microcapsule pigment according to claim 2 and a resin for molding.

7. A thermochromic coloring color-memory laminate comprising a support and a reversible thermochromic layer wherein the thermochromic coloring color-memory microcapsule pigment according to claim 2 is fixed to a resin in a dispersed state, the layer being provided on the support.

* * * * *